United States Patent [19]

Willcox et al.

[11] Patent Number: 5,270,369
[45] Date of Patent: Dec. 14, 1993

[54] ADDITIVE TO IMPROVE POLYMER CLARITY AND VISCOSITY

[75] Inventors: Kenneth W. Willcox; Francis X. Mueller, Jr., both of Bartlesville, Okla.

[73] Assignee: Phillips Petroleum Company, Bartlesville, Okla.

[21] Appl. No.: 964,177

[22] Filed: Oct. 21, 1992

[51] Int. Cl.$^5$ .................. C08K 5/17; C08C 19/22; C08F 8/32

[52] U.S. Cl. .................. 524/236; 525/380; 526/348.4

[58] Field of Search .................. 524/236; 525/380; 526/348.4

[56] References Cited

U.S. PATENT DOCUMENTS

| | | | |
|---|---|---|---|
| 3,144,436 | 8/1964 | Greene et al. | 260/93.7 |
| 3,248,469 | 4/1966 | Kosinsky et al. | 264/349 |
| 3,287,342 | 11/1966 | Walton | 260/93.7 |
| 3,298,996 | 1/1967 | Nelson | 260/45.85 |
| 3,499,952 | 3/1970 | Kolner et al. | 264/40 |
| 3,607,987 | 9/1971 | Walton et al. | 260/897 |
| 3,663,488 | 5/1972 | Kail | 260/23 H |
| 4,282,076 | 8/1981 | Boynton | 204/159.2 |
| 4,371,645 | 2/1983 | Mahaffey, Jr. | 524/108 |
| 4,375,531 | 3/1983 | Ross | 525/93 |
| 4,508,872 | 4/1985 | McCullough, Jr. | 525/88 |
| 4,535,125 | 8/1985 | McCullough, Jr. | 525/88 |
| 4,552,930 | 11/1985 | Hirota et al. | 525/333.8 |
| 4,574,134 | 3/1986 | Willcox et al. | 524/157 |
| 4,590,231 | 5/1986 | Seltzer et al. | 524/100 |
| 4,612,393 | 9/1986 | Ravichandran et al. | 564/300 |
| 4,649,221 | 3/1987 | Ravichandran et al. | 564/300 |
| 4,666,963 | 5/1987 | Ravichandran et al. | 524/101 |
| 4,668,721 | 5/1987 | Seltzer et al. | 524/95 |
| 4,668,727 | 5/1987 | Ravichandran et al. | 524/239 |
| 4,673,700 | 6/1987 | Ravichandran et al. | 524/96 |
| 4,691,015 | 9/1987 | Behrens et al. | 544/198 |
| 4,696,964 | 9/1987 | Ravichandran | 524/236 |
| 4,703,073 | 10/1987 | Winter et al. | 524/99 |
| 4,782,105 | 11/1988 | Ravichandran et al. | 524/236 |
| 4,808,650 | 2/1989 | Titus et al. | 524/108 |
| 4,845,137 | 7/1989 | Williams et al. | 524/108 |

Primary Examiner—Kriellion S. Morgan
Attorney, Agent, or Firm—Ryan N. Cross

[57] ABSTRACT

A composition comprising a polyolefin and a hydroxylamine is disclosed as having improved clarity and viscosity. In addition, a method of reducing the viscosity and improving the clarity of a polyolefin is disclosed, wherein the process comprises visbreaking the polyolefin in the presence of a hydroxylamine.

28 Claims, No Drawings

ADDITIVE TO IMPROVE POLYMER CLARITY AND VISCOSITY

BACKGROUND OF THE INVENTION

This invention relates to polymer compositions and processes for producing polymers. In a preferred embodiment, this invention relates to utilizing hydroxylamines to visbreak a polyolefin to improve clarity and viscosity properties for injection molding.

Various patents have been directed at improving clarity and viscosities or melt flow rates in polyolefins. For example, U.S. Pat. No. 4,854,137 discloses polyolefin clarity is improved by addition of dibenzylidene sorbitol derivatives having a sulfur-containing substituent. Similarly, U.S. Pat. No. 4,371,645 discloses the use of dibenzylidene sorbitol derivatives in polyolefin clarity improvement. In addition, U.S. Pat. No. 4,552,930 discloses visbreaking polyolefin copolymers using organic peroxides as catalysts. Although the prior art teaches methods of improving polymer clarity and viscosity, there appears no disclosure of the use of hydroxylamines.

SUMMARY OF THE INVENTION

An object of this invention is to improve clarity of polyolefins useful in injection molding.

Another object of this invention is to decrease the viscosity of polyolefins useful in injection molding.

A related object of this invention is to increase the melt flow rate of polyolefins in molding processes.

In accordance with this invention a composition comprising a hydroxylamine and a polyolefin is produced. In addition, this invention relates to the method of using this composition to improve clarity and reduce viscosity for injection molding purposes.

Specifically, in a more preferred aspect, this invention relates to a composition comprising a polymer of 4-methyl-1-pentene and N,N-dioctadecylhydroxylamine. Additionally, this invention relates to the method of using this composition to improve clarity and reduce viscosity for molding purposes.

DESCRIPTION OF THE PREFERRED EMBODIMENTS

The compositions of the present invention comprise polyolefins and hydroxylamines. In one embodiment, the composition of the present invention comprises a polyolefin and a hydroxylamine. In a more preferred embodiment, the composition of the present invention comprises a polyolefin and a hydroxylamine having alkyl side groups having 15 to 20 carbon atoms per side group. In addition, the compositions may contain a variety of other additives, including, but not limited to, corrosion inhibitors, bonding enhancers, plasticizers, and pigments.

The term "polymer" as used herein means a normally solid thermoplastic, synthetic, organic polymeric material, and includes, but is not limited to, homopolymers, copolymers, terpolymers and the like, and combinations of any two or more thereof. The term "polyolefin" as used herein means a polymer of an olefin or alkene monomer.

The term "polymethylpentene" or "poly(4-methyl-1-pentene)" (PMP) is used herein to broadly designate 4-methyl-1-pentene resins whether homopolymers, copolymers, terpolymers, and the like, or a blend of such polymers.

The polymers which can be visbroke according to the improved process of this invention include any of those normally solid polymers prepared from mono-1-olefin. The olefins which can be used preferably include at least one olefin selected from those having a maximum of eight carbon atoms per molecule such as ethylene, propylene, 1-butene, 1-pentene, 3-methyl-1-butene, 4-methyl-1-pentene, and the like, and the term "polymer"/"polyolefin" as used herein includes homopolymers and copolymers of such olefins, such as ethylene propylene copolymer and ethylene-butene copolymer. A particularly preferred polymer is poly(4-methyl-1-pentene).

A wide variety of catalyst systems are known in the prior art for polymerizing mono-1-olefins to form high molecular weight, normally solid polymers. Any of such catalyst systems can be used to prepare the polymers which are visbroken according to this invention.

The additives which were used according to this invention to accelerate the visbreaking treatment of solid polymers are hydroxylamines having the general formula:

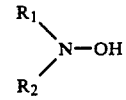

where: $R_1$ and $R_2$ are hydrocarbon radicals such as alkyl, preferably, alkyls having between about 15 and about 20 carbon atoms. More preferably the hydroxylamine is a di(alkyl)hydroxylamine of the type described above. Even more preferably the hydroxylamine is N,N-dioctadecylhydroxylamine.

The aforementioned hydroxylamines function as a catalyst in the visbreaking treatment of this invention and only small amounts are necessary to bring about the desired reduction in viscosity. Generally, the amount of hydroxylamine will be from about 0.005% to about 0.5%, preferably from about 0.005% to about 0.2%, and more preferably from 0.01% to 0.1% by weight of said total composition. The hydroxylamine can be added to and brought into contact with the polymer to be visbroken by any suitable means. For example, the hydroxylamine can be simply mixed with the polymer in particulate form, or can be incorporated into the polymer by milling or kneading procedures in a mixer or on a roll mill. Alternatively, the hydroxylamine can be dissolved in a volatile inert solvent, such as water, acetone, ethyl ether, ethyl alcohol, and the like, and sprayed into the particulate polymer to be visbroken, for example, while the polymer is being conveyed in a screw conveyer or while it is tumbling in a drum. After addition of the hydroxylamine, the solvent can be removed by a current of air and/or heating. In short, any suitable technique for admixing the polymer with the hydroxylamine can be used.

The admixture of the hydroxylamine and polymer is then visbroken using a suitable visbreaking technique. For example, the additive-polymer mixture can be extruder in a single or twin screw extruder. The visbreaking will occur at a temperature above the melting point of the polymeric materials used, usually above about 240° C., preferably from about 250° C. to about 320° C., and most preferably from 260° C. to 310° C. The visbreaking process is continued until the desired increase in melt flow rate is obtained.

In a preferred embodiment, a polymer of 4-methyl-1-pentene is visbroken in the presence of a hydroxylamine to form a polymer composition having a melt flow, as determined by Procedure A of ASTM D1238-79 at 260° C. under a load of 5 Kg, greater than about 60 gm/10 min, and preferably greater than 100 gm/10 min.

A further understanding of the present invention and its advantages will be provided by reference to the following examples. The examples are provided merely to illustrate the practice of the invention and should not be read as limiting the scope of the invention or the appended claims in any way. Reasonable variations and modifications, not departing from the essence and spirit of the invention, are contemplated to be within the scope of patent protection desired and sought.

EXAMPLES

In the following control and example, melt flow was determined using Procedure A of ASTM D1238-79 (260° C., 5 Kg).

CONTROL

PMP homopolymer having a melt flow of 12 gm/10 min. and containing 0.1 wt-% BHT under went visbreaking in a ¾ inch Brabender single screw extruder running at 30 rpm. Visbreaking was carried out at 300 C for 2.3 minutes. The PMP was extruder pelletized from the extruder and the melt flow of the resulting PMP pellets was measured. The results are shown in Table A as run 1.

EXAMPLE I

PMP, as described above, was dry blended with N,N-dioctadecylhydroxylamine. Four different blends were prepared, each containing differing weight-percents of N,N-dioctadecylhydroxylamine. Each of the four blends then underwent visbreaking as described above and the melt flows of the resulting PMP pellets were measured. The results are shown in Table A as runs 2-5.

TABLE A

| Run | Wt.-% Additive | Melt Flow gm/10 min. |
| --- | --- | --- |
| 1 | — | 19 |
| 2 | 0.01 | 60 |
| 3 | 0.1 | 62 |
| 4 | 0.2 | 108 |
| 5 | 0.5 | 132 |

From Table A it can be seen that the melt flow of the polymer has been increased, and, hence, the viscosity has been reduced by the addition of a hydroxylamine followed by visbreaking. Additionally, a comparison of Run 1 with Runs 2-5 shows a substantial increase in melt flow when the polymer was visbroken in the presence of a hydroxylamine than when no hydroxylamine is present.

That which is claimed is:

1. A composition comprising a poly(4-methyl-1-pentene) and a hydroxylamine, wherein said poly(4-methyl-1-pentene) has been visbroken in the presence of said hydroxylamine.

2. A composition according to claim 1, wherein said hydroxylamine is a hydroxylamine having alkyl side groups, wherein said alkyl side groups have between about 15 and about 20 carbon atoms.

3. A composition according to claim 1, wherein said hydroxylamine is a N,N-dioctadecylhydroxylamine.

4. A composition according to claim 1, wherein said hydroxylamine comprises from about 0.005% to about 0.5% by weight of said total composition.

5. A composition according to claim 1, wherein said hydroxylamine comprises from about 0.005% to about 0.2% by weight of said total composition.

6. A composition according to claim 1, wherein said hydroxylamine comprises from 0.01% to 0.1% by weight of said total composition.

7. A composition according to claim 1, wherein said hydroxylamine is N,N-dioctadecylhydroxylamine and said N,N-dioctadecylhydroxylamine comprises from about 0.005% to about 0.5% by weight of said total composition.

8. A composition comprising a poly(4-methyl-1-pentene) and a hydroxylamine, said composition having a melt flow, as determined by procedure A of ASTM D1238-79 at 260° C. under a load of 5 Kg, greater than about 60 gm/10 min.

9. A composition according to claim 8, wherein said hydroxylamine is a hydroxylamine having alkyl side groups, wherein said alkyl side groups have between about 15 and about 20 carbon atoms.

10. A composition according to claim 8, wherein said poly(4-methyl-1-pentene) has been visbroken in the presence of said hydroxylamine.

11. A composition according to claim 8, wherein said hydroxylamine is N,N-dioctadecylhydroxylamine.

12. A composition according to claim 8, wherein said melt flow is greater than about 100 gm/10 min.

13. A process for reducing the viscosity of poly(4-methyl-1-pentene) comprising visbreaking said Poly(4-methyl-1-pentene) in the presence of a hydroxylamine.

14. A process according to claim 13, wherein said hydroxylamine is a hydroxylamine having alkyl side groups, wherein said alkyl side groups have between about 15 and about 20 carbon atoms.

15. A process according to claim 13, wherein before said visbreaking, said (poly(4-methyl-1-pentene) is mixed with said hydroxylamine.

16. A process according to claim 13, wherein said visbreaking results in a poly(4-methyl-1-pentene) composition having a melt flow, as determined by Procedure A of ASTM D1238-79 at 260° C. under a load of 5 Kg, greater than about 60 gm/10 min.

17. A process according to claim 16, wherein said hydroxylamine is N,N-dioctadecylhydroxylamine and said visbreaking occurs at a temperature above about 240° C.

18. A process according to claim 13, wherein said hydroxylamine is present in an amount from about 0.005% to about 0.5% by weight of said total amount of said poly(4-methyl-1-pentene) and hydroxylamine.

19. A process according to claim 13, wherein said hydroxylamine is present in an amount from about 0.005% to about 0.2% by weight of said total amount of said poly(4-methyl-1-pentene) and hydroxylamine.

20. A process according to claim 13, wherein said hydroxylamine is present in an amount from 0.01% to 0.1% by weight of said total amount of said poly(4-methyl-1-pentene) and hydroxylamine.

21. A process according to claim 13, wherein said hydroxylamine is N,N-dioctadecylhydroxylamine and is present in an amount from 0.01% to 0.1% by weight of said total amount of said poly(4-methyl-1-pentene) and N,N-dioctadecylhydroxylamine.

22. A process for reducing the viscosity and improving the clarity of poly(4-methyl-1-pentene) comprising visbreaking said poly(4-methyl-1-pentene) in the presence of a hydroxylamine.

23. A process according to claim 22, wherein said hydroxylamine is a hydroxylamine having alkyl side groups, wherein said alkyl side groups have between about 15 and about 20 carbon atoms.

24. A process according to claim 22, wherein before said visbreaking, said poly(4-methyl-1-pentene) is mixed with said hydroxylamine.

25. A process according to claim 23, wherein said visbreaking results in a poly(4-methyl-1-pentene) composition having a melt flow, as determined by Procedure A of ASTM D1238-79 at 260° C. under a load of 5 Kg, greater than about 60 gm/10 min.

26. A process according to claim 25, wherein said hydroxylamine is N,N-dioctadecylhydroxylamine and said visbreaking occurs at a temperature above about 240° C.

27. A process according to claim 22, wherein said hydroxylamine is present in an amount from about 0.005% to about 0.5% by weight of said total amount of said poly(4-methyl-1-pentene) and hydroxylamine.

28. A process according to claim 22, wherein said hydroxylamine is N,N-dioctadecylhydroxylamine and is present in an amount from 0.01% to 0.1% by weight of said total amount of said poly(4-methyl-1-pentene) and N,N-dioctadecylhydroxylamine.

* * * * *